Oct. 30, 1928.
McGINNIS CHURCHILL
PLOW
Filed Nov. 11, 1927
1,690,055
2 Sheets-Sheet 1
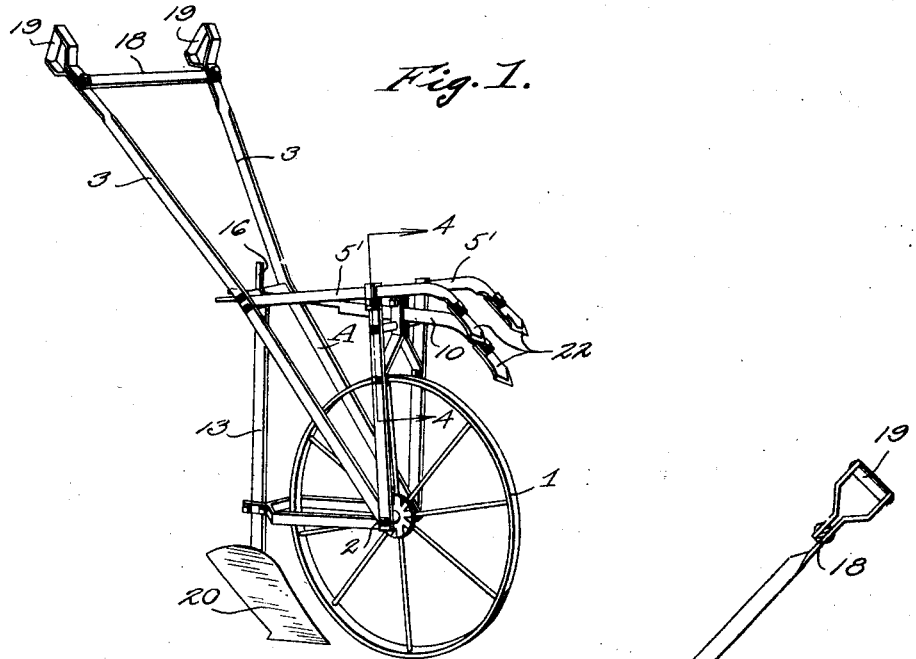
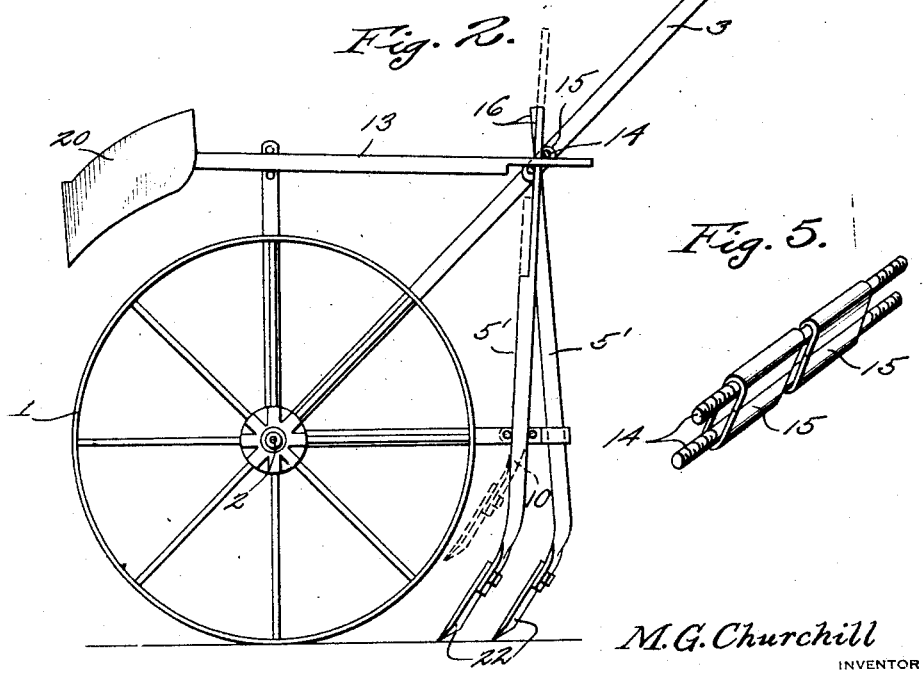
M. G. Churchill
INVENTOR
BY Victor J. Evans
ATTORNEY
WITNESS:

Oct. 30, 1928.
McGINNIS CHURCHILL
PLOW
Filed Nov. 11, 1927
1,690,055
2 Sheets-Sheet 2
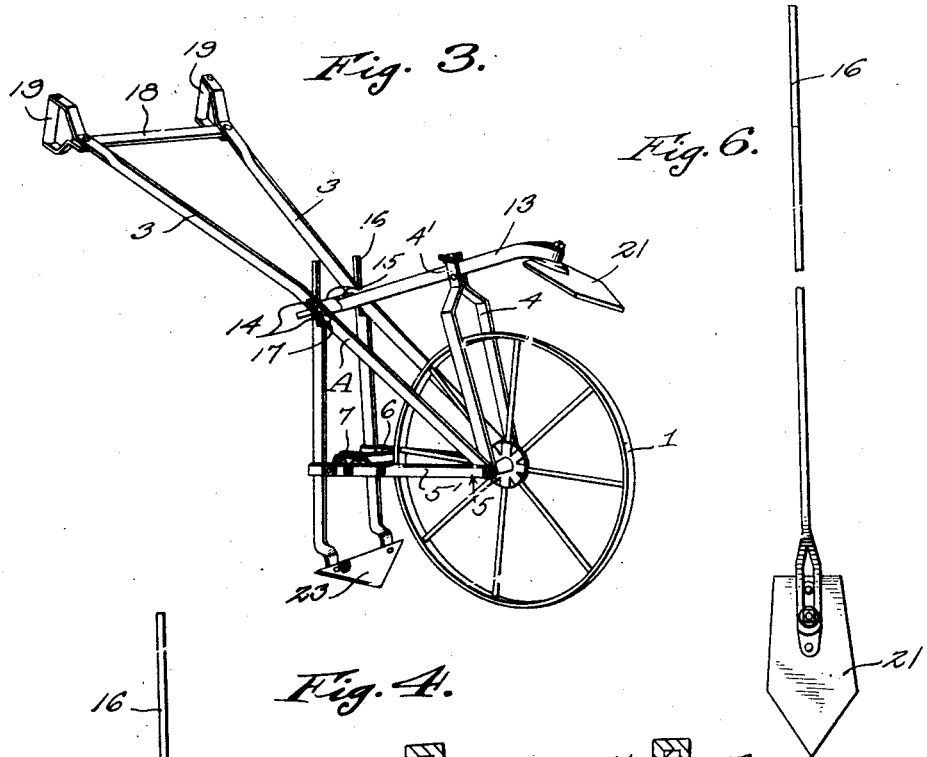
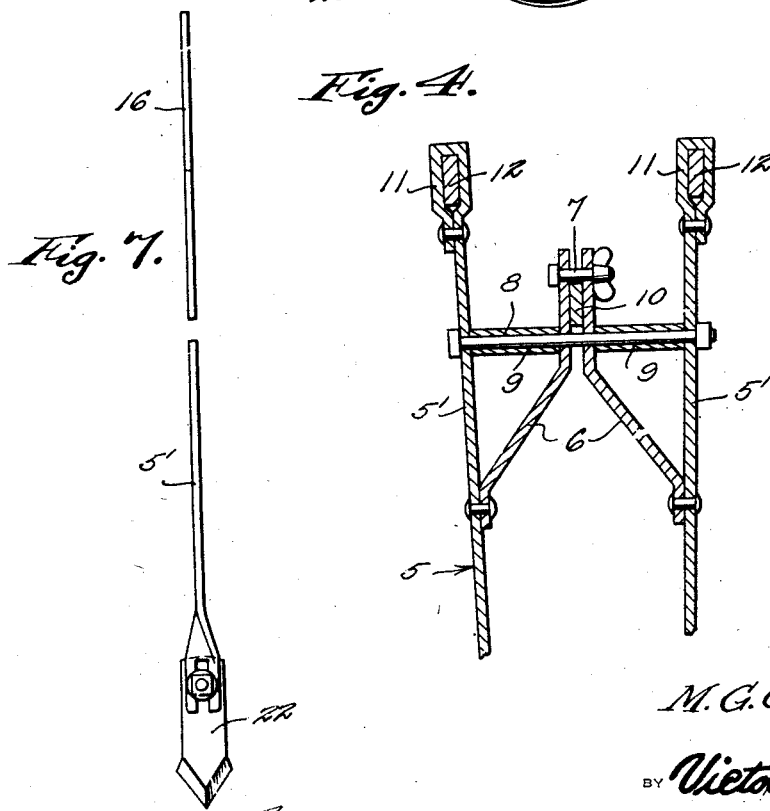
M. G. Churchill
INVENTOR
BY Victor J. Evans
ATTORNEY Patented Oct. 30, 1928.

1,690,055

UNITED STATES PATENT OFFICE.

McGINNIS CHURCHILL, OF MURRAY, NEBRASKA.

PLOW.

Application filed November 11, 1927. Serial No. 232,649.

This invention relates to an agricultural implement, the general object of the invention being to provide a garden plow which is provided with two sets of plow holding beams, one set being arranged at right-angles to the other so that either set can be brought into use by moving the frame on the wheel axle, the parts being so arranged that when one set is in use, the other set extends substantially horizontally above the wheel.

Another object of the invention is to provide one set with three beams, the central one of which can be adjusted so that its plow will be out of use while the plows of the outer beams are in use so that these latter plows can be used for covering seeds in a row or the like.

A still further object of the invention is to make the beams removable and to provide means whereby different kinds of plows can be attached to the beams so that the implement can be used for various kinds of work in a garden or the like.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a perspective view of the implement.

Figure 2 is an enlarged side view thereof, showing the parts reversed to bring into use a different set of plows.

Figure 3 is a view similar to Figure 1, showing different kinds of plows attached to the beams.

Figure 4 is a section on line 4—4 of Figure 1.

Figure 5 is a perspective view of the means for supporting the upper ends of the beams.

Figure 6 is a view of one beam with a plow attached thereto.

Figure 7 is a view of another beam with a plow attached thereto.

In these views, 1 indicates the wheel of the device, the spindle or axle 2 of which is journaled in the frame A which is composed of the two handle members 3, the yoke-shaped member 4 and the member 5, the members 4 and 5 being arranged at substantially rightangles to each other, with the lower parts of the members 3 intermediate the members 4 and 5, the limbs of the members 4 and 5 and the members 3 having their extremities perforated to receive the ends of the spindle, as shown. The member 5 is composed of the two side pieces 5' and the two inner pieces 6 which are fastened to the side pieces 5' and converge and have their free ends straight and these free ends are connected together by the bolt and wing nut shown generally at 7. A long bolt 8 passes through the side pieces 5' and the straight portions of the pieces 6 and spacers 9 are placed on the bolt, one between each pair of the pieces 5' and 6. The straight portions of the inner pieces 6 form a clamp for receiving a plow beam 10, the beam being clamped between the two pieces by tightening the wing nut on the bolt 7. The outer ends of the side pieces 5' are formed with loops or eyes 11 for receiving the plow beams 12 so that the member 5 supports parts of a set of three beams. The member 4 is formed with a clamping part 4' for receiving a single beam 13. Two bolts 14 pass through the handle members 3 intermediate their ends and a pair of spacers 15 are placed on these bolts. All of the beams are provided with reduced ends 16 which are adapted to pass between the bolts 14, with some of the beams passing between the two spacers 15 and others between the spacers and the members 3 so that by tightening the wing nut 17 on one of the bolts 14, these reduced ends of the beams will be held in position.

The outer ends of the members 3 are connected together by a cross bar 18 and each of the outer ends is provided with a handle 19.

From the foregoing it will be seen that the beams are detachably held in the frame and that either the two beams 12 can be used alone or they can be used with the third beam 10. This beam 10 has a long reduced end 16 so that it can be moved to a position where its plow will not engage the ground as shown in dotted lines in Figure 2, so that the two plows of the other beams of this set can be used for covering or other purposes.

It will, of course, be understood that various kinds of plows or ground engaging members can be used with the beams. For instance, a small furrow plow 20 can be attached to the single beam 13 or a double shovel or the like can be attached to this beam, as shown at 21 in Figures 3 and 6. Cultivator plows 22 can be attached to the set of beams carried by the member 5 or a weeder plow 23 can be attached to the two beams 12 and the beam 10 removed or raised, as shown in Figure 3. As will be seen from the drawings, when one set of beams is in use, the other set is held in inoperative position above the wheel and then when this other set is to be brought into use, it is simply necessary to reverse the position of the frame by rocking it on the wheel spindle.

Thus it will be seen that I have provided a simple form of garden plow which can be used for various purposes, such as plowing, cultivating, covering, weeding and the like and that the beams can be easily removed and replaced and the center beam of one set raised to an inoperative position when desired.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. An agricultural implement comprising a frame, a wheel carried thereby, said frame comprising a pair of handle bars and a pair of beam carrying members, the beam carrying members being arranged at rightangles to each other with the handle bars between the two members, plow beams removably connected with the members, means for detachably connecting plows with the beams, the other ends of the beams being reduced, one beam having a long reduced portion and clamping means associated with the handle bars for engaging the reduced ends of the beams.

2. A garden implement comprising a frame composed of a pair of handle bars and a pair of beam carrying members, the beam carrying members being arranged at right-angles to each other with the handle bars between them, three plow beams removably connected with one member, a single beam removably connected with the other member, plows detachably carried by the beams and clamping means carried by the handle bars for engaging the upper ends of the beams.

3. A garden implement comprising a frame composed of a pair of handle bars and a pair of beam carrying members, the beam carrying members being arranged at rightangles to each other with the handle bars between them, three plow beams removably connected with one member, a single beam removably connected with the other member, plows detachably carried by the beams, clamping means carried by the handle bars for engaging the upper ends of the beams, such means comprising a pair of bolts carried by the handle bars, spacers on the bolts and nuts on the bolts for causing the spacers to clamp the ends of the beams between themselves and the handle bars.

In testimony whereof I affix my signature.

McGINNIS CHURCHILL.